United States Patent [19]

Yoshimura et al.

[11] Patent Number: 5,043,815
[45] Date of Patent: Aug. 27, 1991

[54] VIDEO SIGNAL PROCESSING DEVICE

[75] Inventors: Katsuji Yoshimura, Kanagawa; Tadayoshi Nakayama, Tokyo; Chikara Sato, Kanagawa, all of Japan

[73] Assignee: Canon Kabushiki Kaisha, Tokyo, Japan

[21] Appl. No.: 300,818

[22] Filed: Jan. 23, 1989

[51] Int. Cl.⁵ .................. H04N 5/213; H04N 9/64
[52] U.S. Cl. ............................ 358/167; 358/166; 358/36; 358/37
[58] Field of Search ............ 358/36, 37, 166, 167

[56] References Cited

U.S. PATENT DOCUMENTS

| | | | |
|---|---|---|---|
| 4,393,452 | 7/1983 | Sekijawa | 358/166 |
| 4,594,726 | 6/1986 | Willis | 358/36 |
| 4,652,908 | 3/1987 | Fling et al. | 358/166 |
| 4,827,343 | 5/1989 | Naimpally | 358/166 |

Primary Examiner—John K. Peng
Attorney, Agent, or Firm—Robin, Blecker, Daley & Driscoll

[57] ABSTRACT

A video signal processing device comprising a subtractor for computing a difference signal between an input video signal and a video signal input a predetermined period before relative to the input video signal, a computer for applying a predetermined computation to the difference signal, an adder for adding that computation result to the input video signal or the video signal input the predetermined period before and outputting the result, a delay circuit for delaying the output of the adder by the predetermined period, and a dither generator for generating a dither pattern, being characterized in that the dither pattern generated by the dither generator is added to the signal output from the computer or the adder.

18 Claims, 3 Drawing Sheets

VIDEO SIGNAL PROCESSING DEVICE

Background of the Invention

1. Field of the Invention

This invention relates to a video signal processing device in which noise reduction effects of the video signal are produced and predetermined special effects are imparted thereto.

2. Description of the Related Art

In a photography using a silver halide camera, there are known special effects and special photographic expressions such as stopping a motion of an object by the high-speed shutter and leaving a visual persistence as a moving object is shot by the slow shutter. By contrast, in a video camera, the high-speed shutter function has already been realized by shortening the charge storing time of the image pickup element, but no perfect function equivalent to the slow shutter is so far available. Yet, it is known to utilize the field correlation in imparting some visual persistence effect to a picture by varying the coefficient of the cyclic type noise reduction circuit, as, for example, in U.S. patent application Ser. No. 215,823 filed on July 6, 1988 assigned to the assignee of the present invention.

FIG. 1 in a block diagram illustrates the construction of the prior known field cyclic type noise reduction circuit. An input video signal is converted into a digital signal by an A/D converter 10, and the difference between the digital signal and a video signal input one field period before supplied from a field memory 14 is obtained by a subtractor 12. The difference signal output from the subtractor 12 is supplied to a coefficient multiplier 16, where it is multiplied by a coefficient A. An adder 18 adds the signal output from the coefficient multiplier 16 and the signal input one field before supplied from the field memory 14. The output of the adder 18 is supplied to a D/A converter 20 and the field memory 14. The field memory 14, as has been described above, functions as a delay element of one field period. Also, the D/A converter 20 restores the digital video signal to the analog signal. The output of the D/A converter 20 becomes a noise-reduced output.

In the circuit of FIG. 1, by setting the coefficient A of the coefficient multiplier 16 to a proper value, a noise reduction effect for reducing a noise component having no field correlation and other effects such as giving a visual persistence to the image of a moving object can be realized.

The conventional circuit of this kind, however, has the following problems. That is, the coefficient multiplier 16 of FIG. 1, concretely speaking, performs a bit-shifting operation by dividing the input by $2^n$ (n being an integer of not less than one). But the division relied on the bit-shifting operation is to cut off the figures below the decimal point, or the fraction. Hence, assuming that when, for example, n=5 is set to enhance the visual persistence effect, the multiplier 16 carries out the computation in which the signal output from the subtractor 12 is divided by $2^5$, then any level change by less than 32 levels between fields does not suffice for appreciably changing the picture at all, thus constituting a problem. Therefore, the reliance on adjustment of the coefficient A has been limited.

Also, in the ordinary motion-adaptive type noise reduction circuit, it is the practice that when the input of the coefficient multiplier 16 is smaller than a predetermined value, the coefficient A is made to be almost "0". In such a case, too, there is a problem that a small level change is not enough to effect a substantial change of the picture.

SUMMARY OF THE INVENTION

An object of the invention is to eliminate the above-described problems.

Another object is to provide a video signal processing device which is responsive even to a small level change, and which is able to give adequate visual persistence and noise reduction effects.

Under such objects, according to the invention, as its one embodiment, a video signal processing device is proposed, comprising input means for inputting a video signal, subtracting means having two inputs to one of which the video signal input by the input means is supplied, computing means for applying a predetermined computation to a signal output from the subtracting means, adding means having two inputs to one of which a signal output from the computing means is supplied, delay means for delaying a signal output from the adding means by a predetermined period to supply the delayed signal to other inputs of the subtracting means and the adding means, and dither generating means for adding a dither pattern to the signal output from the computing means or the adding means.

Other objects of the invention than those described above and its features will become apparent from the following detailed description of embodiments of the invention.

DETAILED DESCRIPTION OF THE PREFERRED EMBODIMENTS

The invention is next described in connection with embodiments thereof by reference to the drawings.

Figure 1:
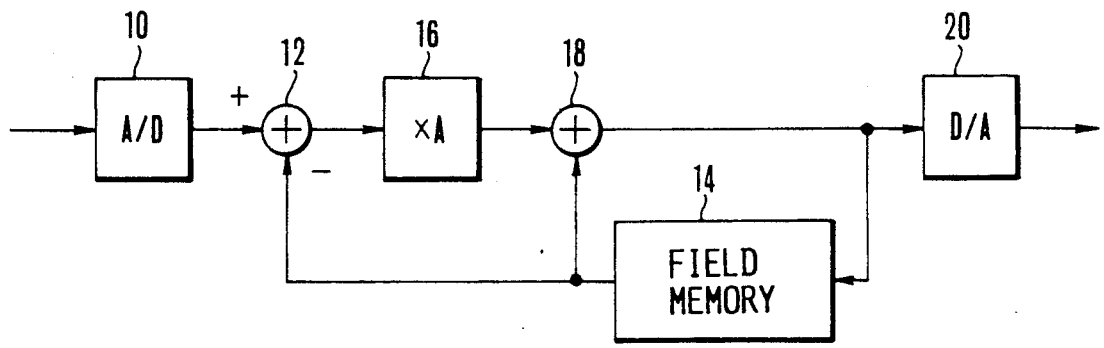
FIG. 1 is a diagram illustrating an example of construction of the conventional video signal processing circuit.
Figure 2:
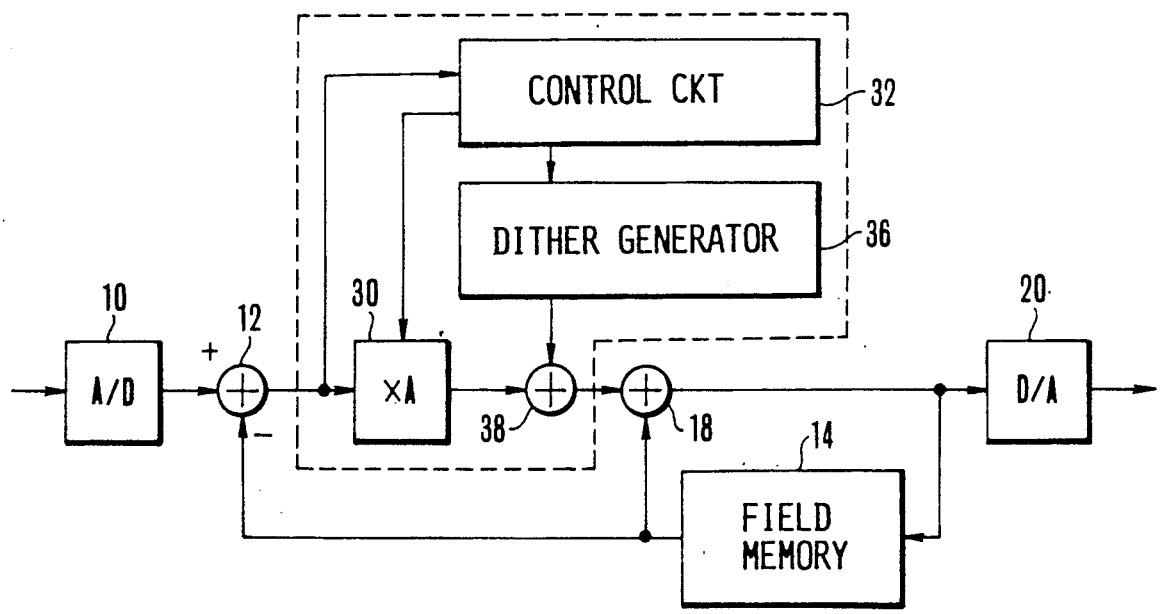
FIG. 2 is a diagram illustrating the construction of an embodiment of a video signal processing circuit according to the invention.

FIG. 2 is a block diagram illustrating the construction and arrangement of the elements of an embodiment of the invention, wherein the same constituent elements as those of FIG. 1 are denoted by the same reference numerals. A coefficient multiplier 30 in replacement of the coefficient multiplier 16 of FIG. 1 can vary the coefficient A in response to a control signal output from a control circuit 32. A dither generator 36 generates a dither pattern in response to an instruction of the control circuit 32. An adder 38 adds the dither pattern output from the dither generator 36 to the output of the coefficient multiplier 30, and applies its addition result to another adder 18. The stage that follows the adder 18 is the same as that described in connection with the conventional example.

Figure 3:
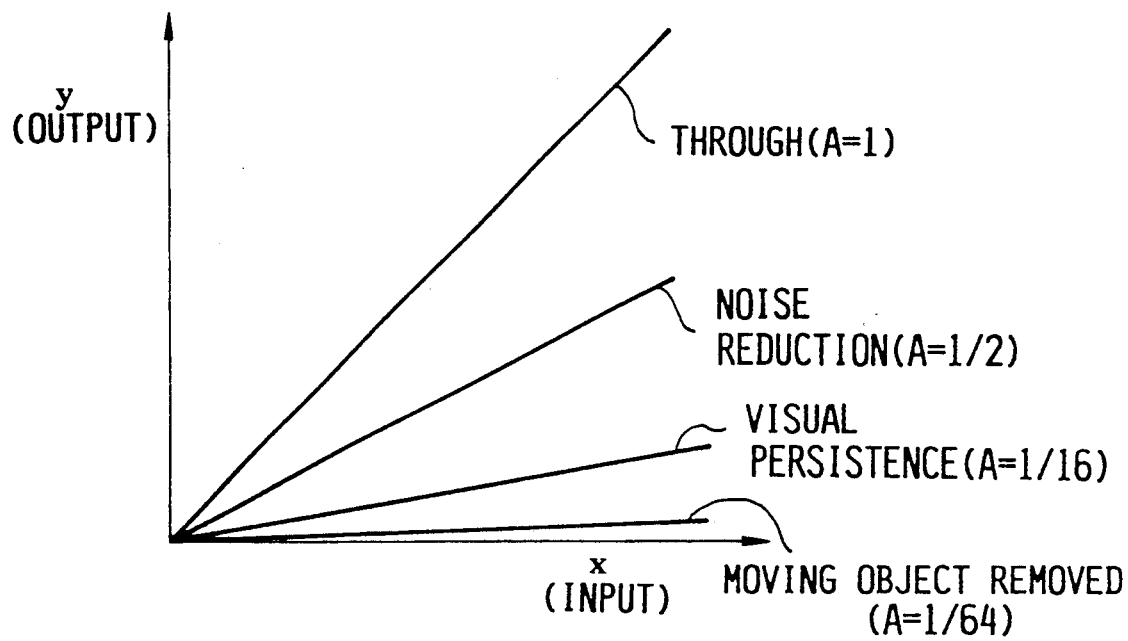
FIG. 3 is a graph to explain the input-output characteristics of the coefficient multiplier of FIG. 2 and the corresponding effects thereto.

Next, the input-output characteristics of the coefficient multiplier 30 and an example of the corresponding special effect to this are explained with reference to FIG. 3.

When the luminance at the time of shooting is sufficiently high, there is no problem concerning S/N (signal-to-noise). Therefore, the coefficient A of the coefficient multiplier 30 is set to "1", and no dither pattern is generated by the dither generator 36. In this case, the difference between the input video signal and the video signal input one field before (the output of the subtractor 12) is added, as it is, to the video signal input one field before, in the adder 18. In other words, the video signal is to merely pass through the circuit.

When the luminance is somewhat low, the coefficient A is made to be "½" by the control circuit 32, and the dither generator 36 is caused to generate a dither pattern. In this case, the output of the coefficient multiplier 30 becomes ½ as high, so that the noise can be reduced in such a range as not to leave any visual persistence. Also, because the aforesaid dither pattern is added to the output of the coefficient multiplier 30 by the adder 38, even a small level change enables the image to be certainly rewritten.

In a case where it is desired to give such a visual persistence as to stretch images, the coefficient A is made to be as small as "1/16", and a dither pattern is generated by the dither generator 36. In this case, the noise reduction effect is great. Concerning the moving part, as the object to be photographed moves, a visual persistence in the nature of image stretching takes place. Also, by the addition of the dither pattern, though it takes more or less a time, it becomes sure that the picture changes.

In another case where it is desired to erase the moving part, the coefficient A is made to be as small as "1/64", and a dither pattern is generated by the dither generator 36. In this case, because the signal of the moving part becomes 1/61 as high, no image of the moving part appears in the picture frame. Thus, a still picture of largely reduced noise is output. For this reason, the addition of the dither pattern causes the picture to change gently.

Figure 4:
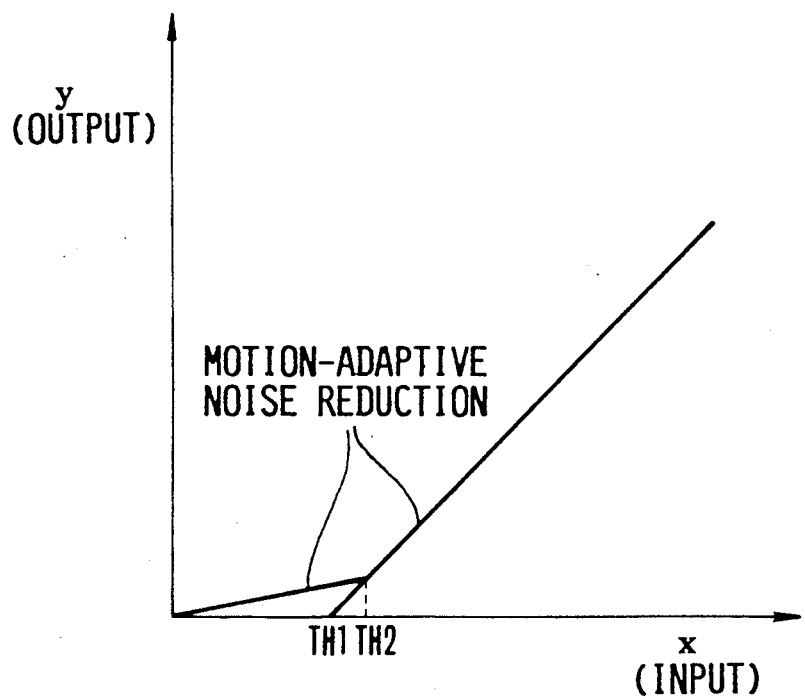
FIG. 4 is a graph illustrating a way in which the value of the coefficient of the coefficient multiplier of FIG. 2 is adaptively changed according to the level of the input signal.

Also, even in the motion-adaptive type noise reduction circuit in which the value of the coefficient A of the coefficient multiplier is made to change adaptively in response to the level of the input signal (for example, in FIG. 2, the output level of the subtractor 12), as shown in FIG. 4, an input video signal has a level lower than the threshold level, the dither pattern is added to the output of the coefficient multiplier, so that it can be made to surely follow up even the small change of level. It should be noted that in this case, as the coefficient multiplier, it is convenient to use a ROM table or like lookup table.

Though, in the embodiment of FIG. 2, the adder 38 for the dither pattern is positioned in between the coefficient multiplier 30 and the adder 18, it may otherwise be positioned in between the adder 18 and the field memory 14. Even in this case, an equivalent effect is obtained.

Figure 5:
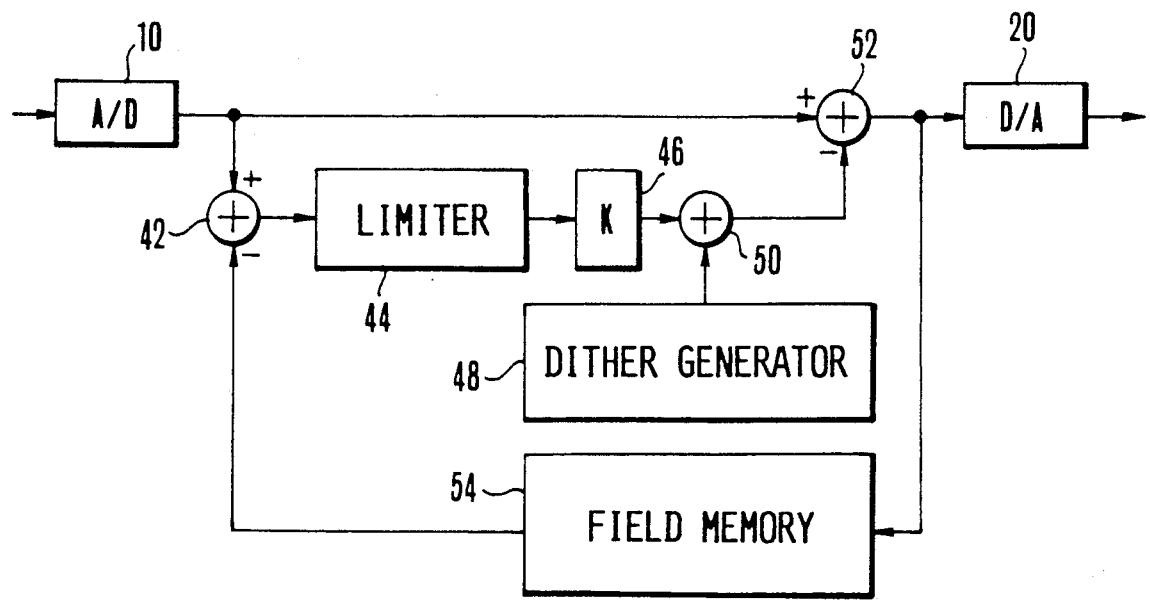
FIG. 5 is a diagram illustrating the construction of another embodiment of the video signal processing circuit according to the invention.

FIG. 5 is a block diagram of the construction of another embodiment of the noise reduction circuit according to the invention. The input video signal digitized by an A/D converter 10 and the video signal delayed one field period by a field memory 54 are supplied to a subtractor 42 to obtain a difference signal. This difference signal is supplied through a limiter 44 to a coefficient multiplier 46. That is, a signal whose level is lower than the threshold level of the limiter 44 is regarded as almost noise, and it is removed from the signal output from the A/D converter 10. The nearer the value of a coefficient K by which the coefficient multiplier 46 multiplies is to "1", the greater the noise reduction effect. But, when K=1, the output video signal having a level change below the threshold value of the limiter 44 no longer responds to a motion of the image. So, it is general that K is set to about "15/16". But even in this case, if the level of the difference signal is extremely small, an equivalent computation result to that when the coefficient K is made to be "1" is obtained.

Therefore, in this embodiment, the dither pattern generated by the dither generator 48 is added to the output of the coefficient multiplier 46, so that it is made possible to follow up a motion of the image even when the level change is small.

Incidentally, in the embodiment of FIG. 5, the dither pattern may otherwise be added to the output of the adder 52. Even in this case, an equivalent effect is obtained, as a matter of course.

As can be understood from the foregoing description, according to the present invention, the supplement of a few circuit elements suffices for making it possible to realize various kinds of special effects responsive to a small level change and the removal of the noise component without leaving any visual persistence.

What is claimed is:

1. A video signal processing device comprising
   (a) input means for inputting a video signal;
   (b) subtracting means having two inputs to one of which the video signal input by said input means is supplied;
   (c) computing means for applying a predetermined computation to a signal output from said subtracting means;
   (d) adding means having two inputs to one of which a signal output from said computing means is supplied;
   (e) delay means for delaying a signal output from said adding means a predetermined period to supply the delayed signal to other inputs of said subtracting means and said adding means; and
   (f) dither generating means for adding a dither pattern to the signal output from one of the computing means and the adding means.

2. A device according to claim 1, wherein said computing means includes a coefficient adding circuit for multiplying the signal output from said subtracting means by a predetermined coefficient.

3. A device according to claim 2, wherein said video signal is a digital signal, and wherein said coefficient adding circuit divides the digital signal output from said subtracting means by a power multiplier of "2" to effect a bit-shifting operation.

4. A device according to claim 2, further comprising coefficient control means for adaptively changing over the coefficient by which said coefficient adding circuit multiplies in accordance with the level of the signal output from said subtracting means.

5. A device according to claim 1, further comprising control means for controlling performance and nonperformance of the addition of the dither pattern by said dither generating means in accordance with the level of the signal output from said subtracting means.

6. A device according to claim 1, wherein said delay means includes a field memory to which the signal output from said adding means is supplied.

7. A device according to claim 1, wherein said dither generating means adds the dither pattern to the signal output from said computing means.

8. A video signal processing device comprising:
(a) input means for inputting a video signal;
(b) first subtracting means having two inputs to one of which the video signal input by said input means is supplied;
(c) computing means for applying a predetermined computation to a signal output from said first subtracting means;
(d) second subtracting means for subtracting a signal output from said computing means from the video signal input by said input means;
(e) delay means for delaying signal output from said second subtracting means by a predetermined period to supply the delayed signal to another input of said first subtracting means; and
(f) dither generating means for adding a dither pattern to the signal output from one of said computing means and said second subtracting means.

9. A device according to claim 8, wherein said computing means includes a coefficient adding circuit for multiplying the signal output from said first subtracting means by a predetermined coefficient.

10. A device according to claim 9, wherein said computing means further includes a limiter for limiting the level of the signal output from said first subtracting means.

11. A device according to claim 8, wherein said delay means includes a field memory to which the signal output from said second subtracting means is supplied.

12. A device according to claim 8, wherein said dither generating means adds the dither pattern to the signal output from said computing means.

13. A video signal processing device comprising:
(a) input means for inputting a video signal; and
(b) signal processing means for applying a predetermined signal treatment to the video signal input by said input means to produce an output, said signal processing means including:
delay means for delaying a signal output from said signal processing means by a predetermined period;
subtracting means for subtracting a signal output from said delay means from the video signal input by said input means;
first computing means for applying a predetermined computation to a signal output from said subtracting means;
second computing means having two inputs to one of which a signal of said first computing means is supplied, and to another of which one of the video signal input by said input means and the signal output from said delay means is supplied, a signal output from said second computing means being the output signal of said signal processing means; and
dither generating means for adding a dither pattern to the signal output from one of said first computing means and said second computing means.

14. A device according to claim 13, wherein said first computing means includes a coefficient adding circuit for multiplying the signal output from said subtracting means by a predetermined coefficient.

15. A device according to claim 14, further comprising coefficient control means for adaptively changing over the coefficient by which said coefficient adding circuit multiplies in accordance with the level of the signal output from said subtracting means.

16. A device according to claim 13, further comprising control means for controlling performance and non-performance of the addition of the dither pattern by said dither generating means in accordance with the level of the signal output from said subtracting means.

17. A device according to claim 13, wherein said delay means includes a field memory to which the signal output from said second computing means is supplied.

18. A device according to claim 13, wherein said dither generating means adds the dither pattern to the signal output from said first computing means.

* * * * *

UNITED STATES PATENT AND TRADEMARK OFFICE
CERTIFICATE OF CORRECTION

PATENT NO. : 5,043,815

DATED : August 27, 1991

INVENTOR(S) : Katsuji Yoshimura, Tadayoshi Nakayama and Chikara Sato

It is certified that error appears in the above-identified patent and that said Letters Patent is hereby corrected as shown below: ON THE TITLE PAGE:

Insert -- [30] Foreign Application Priority Data
January 29, 1988 [JP] Japan..... 63-016894

Signed and Sealed this

Tenth Day of November, 1992

*Attest:*

DOUGLAS B. COMER

*Attesting Officer*      *Acting Commissioner of Patents and Trademarks*